March 7, 1939. C. H. CUMPSTON 2,149,669
COTTON-DRIER GIN
Filed Oct. 26, 1938 2 Sheets-Sheet 1

Inventor
C. H. Cumpston
By Mason Fenwick & Lawrence
Attorneys

March 7, 1939. C. H. CUMPSTON 2,149,669
COTTON-DRIER GIN
Filed Oct. 26, 1938  2 Sheets—Sheet 2
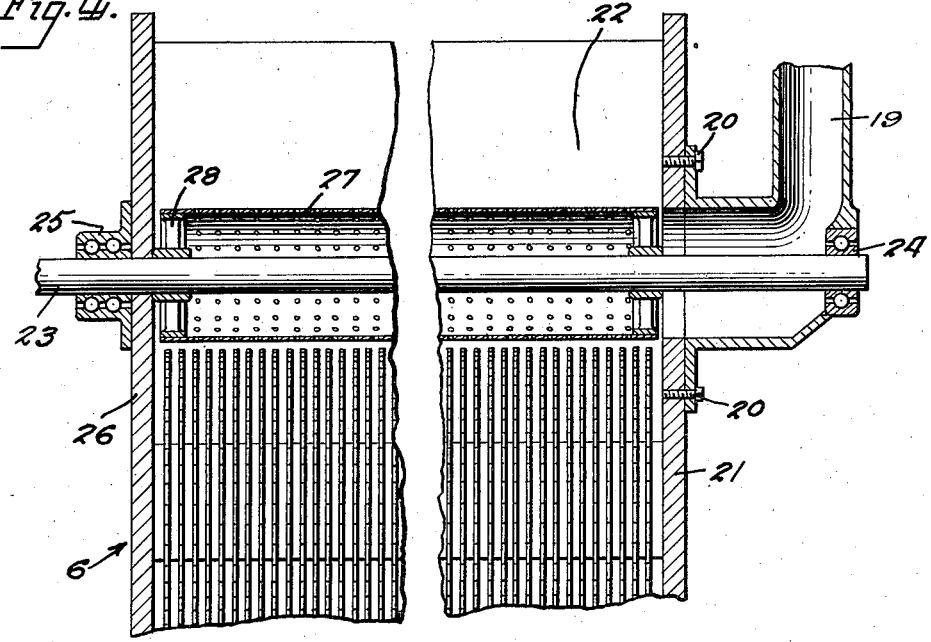
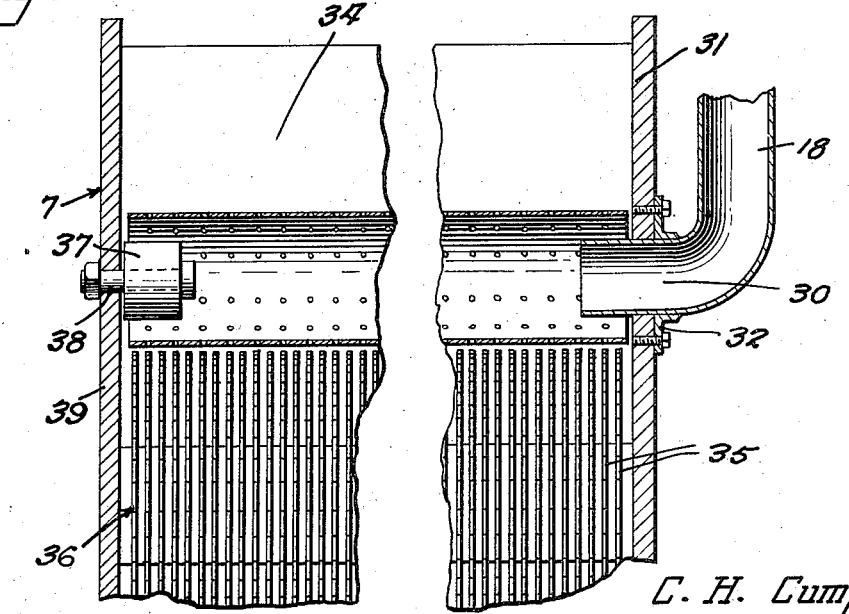
Inventor
C. H. Cumpston
By Mason, Fenwick & Lawrence
Attorneys Patented Mar. 7, 1939

2,149,669

UNITED STATES PATENT OFFICE 2,149,669

COTTON-DRIER GIN

Curtis Henry Cumpston, Dallas, Tex., assignor of one-fourth to Adeline M. McMahon, and one-fourth to Jessiejo Eckford, Dallas, Tex.

Application October 26, 1938, Serial No. 237,104

5 Claims. (Cl. 19—55)

This invention relates to cotton gins generally; and more particularly to cotton gins provided with means for drying seed cotton during the ginning thereof.

The main object of the invention is to provide cotton gins of standard types with means for drying the seed cotton in the roll boxes during the process of ginning the same, and to equalize the cotton rolls in a battery of gin stands.

A further object of the invention is to provide cotton gins of standard type with means for drying the cotton while in the roll box and to enable closer ginning of the cotton seed and to lengthen the staple resulting from the ginning operations.

Other objects of the invention will become apparent as the detailed description thereof proceeds.

In the drawings:

Figure 4 is a fragmentary, longitudinal section through part of the cotton gin shown at the left hand side of Figure 1; and Figure 5 is a fragmentary, longitudinal section of the other cotton gin shown in Figure 1.

Figure 1:
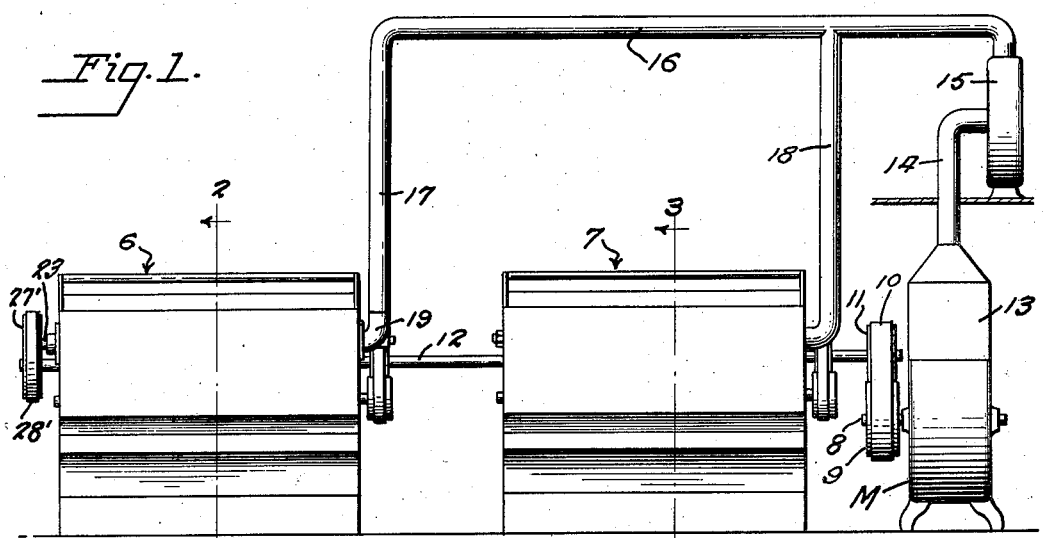
Figure 1 is a fragmentary side elevation of a battery of cotton gins having their roll boxes connected to a source of hot air.

As shown in Figure 1 of the drawings, the invention is applied to a battery of cotton gins only two of which are shown and designated generally by the reference numerals 6 and 7, respectively. Each of these gins is of standard construction, and each is provided with a heating cylinder extending throughout the roll box thereof and adapted to rotate about an axis substantially parallel to the axis of rotation of the gin saw cylinder. The gins are operated by a motor M having its rotor shaft 8 provided with a drive pulley 9 connected by a belt 10 to a driven pulley 11 fixed on the shaft 12 which extends along the gins of the battery and is connected in the usual manner by pulleys and belting to rotate the saw cylinders and the other operating mechanism common to gins of this type.

The present invention begins with a hood 13 arranged over the top of the motor to collect and retain the heat thereof. The hood 13 is connected by a pipe 14 to a fan 15 which draws the hot air from the motor and distributes it through a manifold 16 and pipes 17 and 18 into ends of the roll boxes in the gin battery. The pipe 17 is connected at its lower end to an elbow casting 19 suitably secured by cap screws 20 to the end wall 21 of the gin 6. The horizontal bend of the casting 19 is substantially cylindrical and has its axis coincident with the axis of the roll box 22. A shaft 23 extends through the roll box 22 and is journalled at its opposite ends in ball bearings 24 and 25 mounted, respectively, on the vertical bend of the casting 19 and on the other end wall 26 of the cotton gin 6. A perforated, hollow cylinder or shell 27 is secured at its opposite end by the spiders 28 and 29 to the shaft 23, and is rotated, along with the shaft 23, by means of a pulley 27' secured to the end of shaft 23 and connected by a belt 28' to the drive shaft 12.

Figures 2, 3:
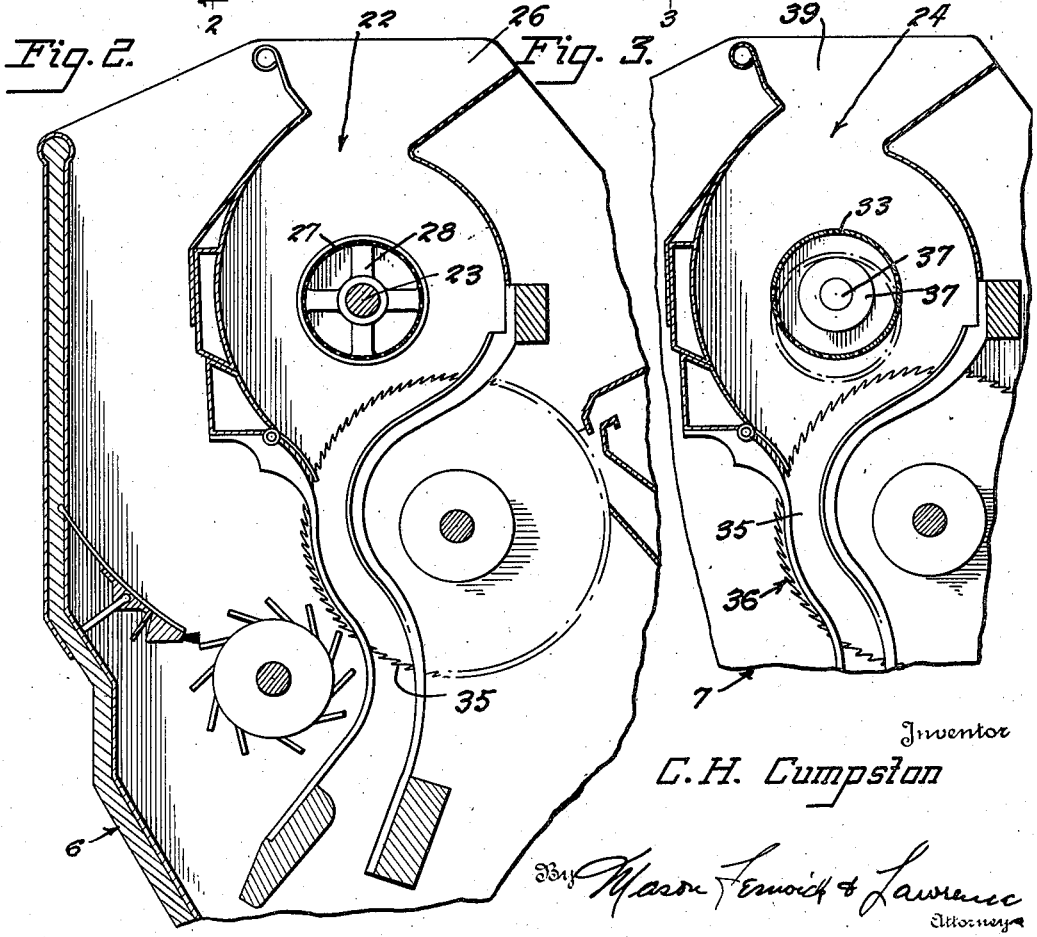
Figure 2 is a vertical, transverse section taken on the line 2—2 of Figure 1.
Figure 3 is a vertical, transverse section taken on the line 3—3 of Figure 1.

It will be obvious from inspection of Figures 2 and 4 of the drawings that the perforated cylinder 27 rotates about a fixed axis in the roll box 22 and aids in turning the roll of seed cotton in the roll box and also enables the hot air to penetrate and dry the rotating roll. This form of the invention, including a drying cylinder rotating about a fixed axis, is peculiarly adapted for use in the ginning of damp cotton.

Where the seed cotton is comparatively dry, a floating form of drying cylinder is preferable; and is illustrated in Figures 3 and 5 of the drawings. The pipe 18 leading from the manifold 16 is bent at its lower end to form a horizontal branch 30 which extends through the end wall 31 of the gin 7 and is held in fixed position thereon by means of the flanged fitting 32 suitably secured to the branch 30 and wall 31. A perforated, hollow cylinder 33, of substantially the same diameter as the shell 27, is mounted in the roll box 34 of the gin 7 to float on and be rotated by the cotton roll in said roll box during the ginning operation.

The cylinder 33 is prevented from dropping onto the saws 35 of the saw cylinder 36 by contact at one end with the inwardly projecting part of the horizontal branch 30, and by contact at the other end with a roller 37 rotatably mounted on a bolt 38 extending through the other end wall 39 of the gin 7. The roller 37 has the same diameter as the outer diameter of the horizontal branch 30 of the pipe 18. The hot air is conducted by the pipe 18 into the perforated cylinder 33 and emerges through the apertures thereof to contact with and dry the seed cotton in the roll box.

The supporting structure for the cylinder 33 is obviously intended to prevent that shell dropping onto the saws of the saw cylinder when there is no cotton roll in the gin stand. The floating shell contacts with the roll during the formation thereof and is rotated merely by the rotation of the cotton roll in the roll box. Since the rigid cylinder or shell 27 is power driven, it obviously assists in rotating the damp roll within the roll box and exercises a more rapid drying effect on the cotton roll. Both cylinders loosen the cotton in the roll and enable the gin saws to remove cotton fibers closer from the seed than is possible with the standard cotton gin. This loosening of the cotton in the roll also enables the seed cotton to be ginned without cutting the staple.

To avoid confusion in the drawings, the floating cylinder 33 is shown in Figure 5 as coaxial with the bend 30 and roller 37. Obviously, this cylinder will drop into the position indicated by dotted lines in Figure 3 when there is no cotton in the roll box.

Obviously, the invention is not to be considered as limited to use with any particular number of cotton gins in a battery. All of the gins in the battery may be provided with the floating perforated heating cylinder, or with power driven cylinders; and some may be provided with one type of heating cylinder while others make use of the other type. Furthermore, the invention is not to be considered as limited to the particular details of construction shown in the drawings, nor to the use of hot air as derived from the power motor M, nor in any other manner except as indicated by the scope of the claims appended hereto.

What I claim is:

1. A cotton gin having a roll box, a perforated cylinder mounted to rotate within said roll box, means for conducting a heating medium into said cylinder, and means for supporting the cylinder in contact with the cotton in the roll box during the ginning thereof and out of contact with the saws of the gin.

2. A cotton gin having a roll box, a perforated cylinder mounted to rotate within said roll box, means for conducting a heating medium into said cylinder, means for supporting the cylinder in contact with the cotton in the roll box during the ginning thereof and out of contact with the saws of the gin, and means for rotating said cylinder.

3. A cotton gin having a roll box, a shaft mounted to rotate on said roll box about an axis substantially parallel to the axis of the gin saw cylinder, a perforated cylindrical shell fixed to said shaft and coaxial therewith, means for rotating said shaft, and means for conducting a heating fluid to the interior of said shell.

4. A cotton gin having a roll box, a perforated cylindrical shell mounted to float on and be rotated by the roll of seed cotton in said roll box, means for conducting the heating fluid to the interior of said shell, and means to support said shell out of contact with the saws of the gin.

5. A cotton gin having a roll box, a perforated shell mounted to float on and be rotated by the roll of said cotton in said roll box, a pipe extending through one end wall of said roll box and connected to a source of heating fluid, and a roller of substantially the same diameter as said pipe and mounted on the other end wall of said box substantially coaxial with said pipe, said pipe and roller limiting the floating movement of said shell to a position close to but out of contact with the saws of said gin.

CURTIS HENRY CUMPSTON.